United States Patent
Fitzgerald et al.

(10) Patent No.: US 6,175,215 B1
(45) Date of Patent: Jan. 16, 2001

(54) SYSTEM AND METHOD FOR EFFICIENTLY CHARGING A BATTERY OVER A LINEAR OR NONLINEAR INTERFACE

(75) Inventors: Joseph R. Fitzgerald, Broomfield; David E. Werner, Boulder; Edmund V. Simmons, Lafayette, all of CO (US)

(73) Assignee: Qualcomm Incorporated, San Diego, CA (US)

( * ) Notice: Under 35 U.S.C. 154(b), the term of this patent shall be extended for 0 days.

(21) Appl. No.: 09/474,917

(22) Filed: Dec. 29, 1999

(51) Int. Cl.[7] .......................... H01M 10/44; H01M 10/46
(52) U.S. Cl. .............................. 320/132; 320/137
(58) Field of Search ................................ 320/106, 116, 320/128, 132, 134, 136, 137

(56) References Cited

U.S. PATENT DOCUMENTS 4,134,056  *  1/1979  Fukui et al. .
5,444,378  *  8/1995  Rogers .

* cited by examiner

Primary Examiner—Edward H. Tso
(74) Attorney, Agent, or Firm—Philip R. Wadsworth; Charles D. Brown; Christopher O. Edwards

(57) ABSTRACT

A system for charging a battery over a linear or nonlinear circuit. The system includes a first mechanism for receiving a feedback signal and providing a charging signal to the battery over a first electrical path when the feedback signal indicates that the battery is not fully charged. A second mechanism measures a voltage state of the battery via second and third electrical paths and provides the voltage state as the feedback signal to the first mechanism in response thereto. The voltage state accounts for voltage drops occurring over the circuit. In the specific embodiment, the first mechanism is a controllable power supply and the second mechanism is a sensing circuit. The sensing circuit includes a subtractor circuit that subtracts the voltage on the second electrical path from the voltage on the third electrical path and provides the feedback signal in response thereto. The second electrical path includes a wire connected between a first terminal of the subtractor circuit and a positive terminal of the battery. The second electrical path also includes a first sensing resistor connected between an output of the power supply and the first terminal of the subtractor circuit. The third electrical path includes a wire connected between a second terminal of the subtractor circuit and a negative terminal of the battery. The third electrical path also includes a second sensing resistor connected between a ground and the second terminal of the subtractor circuit.

28 Claims, 1 Drawing Sheet

PRIOR ART

SYSTEM AND METHOD FOR EFFICIENTLY CHARGING A BATTERY OVER A LINEAR OR NONLINEAR INTERFACE

BACKGROUND OF THE INVENTION

1 Field of Invention

This invention relates to battery charging systems. Specifically, the present invention relates systems and methods for charging a cellular telephone battery over a cable and interface that have linear or nonlinear properties.

2 Description of the Related Art

As the demand for cellular telephones and general consumer electronics increases so does the need for efficient batteries, power supplies, and battery charging mechanisms. Efficient charging mechanisms are particularly important for batteries used in cellular telephones where the batteries are often charged daily.

The batteries of cellular telephones are often charged via an accessory that enables use of the phone while it is being charged. The accessory may include a charger that is connected to a power source in a car horn or other location and that supplies current to a battery in a cellular telephone via a cable. Additional electronic interfaces are often located in the phone between the cable and the phone battery. The charger supplies current to the battery until the voltage drop across the battery, as measured from the output terminals of the charger, reaches a predetermined voltage indicative of a charged battery. Many conventional charging power supplies however, fail to account for voltage drops across the cable and any electronic interfaces. As a result, such power supplies typically fail to fully charge the battery.

Many newer battery charging circuits attempt to account for the voltage drop across the cable and electronic interfaces by incorporating an additional constant voltage factor representative of an estimated voltage drop across the cable and electronic interfaces. For example, if the estimated voltage drop is 0.2 volts and the battery reads 4.0 volts when it is fully charged, the charging circuit will charge the battery until the voltage between the charging circuit terminals is approximately 4.2 volts. However, this method may result in an overcharging of the battery if the estimated voltage drop is larger than the actual voltage drop.

The voltage drop across the cable and any additional electronic interfaces is often a nonlinear function of current and temperature. As a result, the estimated voltage drop, i.e., the constant voltage factor, quickly becomes inaccurate as the current from the power supply changes or as the temperature of the cable and interface changes. This may result in an overcharging or an undercharging of the phone battery.

Alternatively, power supplies may contain control circuits that reduce current flowing through the cable as the battery becomes fully charged. By reducing the current flowing through cable and any associated interface, the voltage drop across the cable and interface is reduced, which reduces charging error caused by the voltage drop. However, as the current flowing through the cable and interface decreases, the time required to fully charge the battery increases. For example a standard desktop charger having no cables or electronic interface between the battery and charging terminals may take two hours to fully charge a phone battery, while a comparable charging accessory that charges the battery through linear or nonlinear cables or phone interfaces may take four hours. The additional required charging time is an inconvenience and may still result in an overcharging of the battery.

Hence, a need exists in the art for a system and method for quickly and accurately charging a battery while accounting for any voltage drop across linear or nonlinear circuitry between the charger and the battery.

SUMMARY OF THE INVENTION

The need in the art is addressed by the system for charging a battery over a linear or nonlinear circuit of the present invention. In the illustrative embodiment, the inventive system is adapted for use with cellular telephone battery and includes a first mechanism for receiving a feedback signal and providing a charging signal to the battery over a first electrical path when the feedback signal indicates that the battery is not fully charged. A second mechanism measures a voltage state of the battery via second and third electrical paths and provides the voltage state as the feedback signal to the first mechanism in response thereto. The voltage state accounts for voltage drops occurring over the linear or nonlinear circuit.

In the specific embodiment, the first mechanism is a power supply having a mechanism for adjusting an output voltage and the second mechanism is a sensing circuit. The sensing circuit includes a subtractor circuit for subtracting a voltage on the second electrical path from a voltage on the third electrical path and providing the feedback signal in response thereto. The second electrical path includes a wire corrected between a first terminal of the subtractor circuit and a positive terminal of the battery. The second electrical path also includes a first resistor connected between an output of the power supply and the first terminal of the subtractor circuit. The first resistor has a resistance that is orders of magnitude larger than a resistance of the linear or nonlinear circuit and that is orders of magnitude less than the input impedance of the subtractor circuit. The third electrical path includes a wire connected between a second terminal of the subtractor circuit and a negative terminal of the battery. The third electrical path includes a second resistor connected between a ground and the second terminal of the subtractor circuit. The second resistor has a resistance that is orders of magnitude larger than a resistance of the linear or nonlinear circuit and orders of magnitude less that an input impedance of the subtractor circuit.

The novel design of the present invention is facilitated by the use of the first and second resistors that facilitate a determination of the voltage drop occurring across the linear or nonlinear circuit. This voltage drop is accounted for at the inputs of the subtractor circuit, which provides, as output, an accurate measurement of the voltage state of the battery to the power supply. The power supply halts the charging of the battery when the voltage state reaches a predetermined level. This allows the battery to be accurately and quickly charged without the risk of overcharging or undercharging.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The following review of the operation of a conventional charging supply is intended to facilitate an understanding of the present invention.

Figure 1:
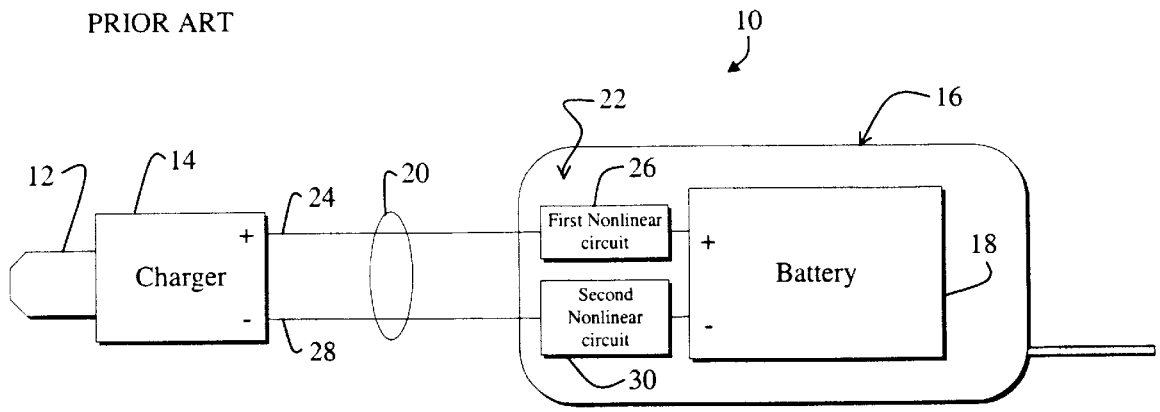
FIG. 1 is a diagram of a conventional battery charging accessory adapted for use with a cigarette socket power adapter and a cellular telephone.

FIG. 1 is a diagram of a conventional battery charging accessory 10 having a cigarette power adapter 12 and charger 14. The accessory 10 is adapted for use with a cellular telephone 16. The charger 14 is connected to a battery 18 in the cellular telephone 16 via a two-line cable 20 and nonlinear circuits 22. The two-line cable 20 includes a positive wire 24 connected to a first nonlinear circuit 26 that is in turn connected to a positive terminal of the battery 18. The two-line cable 20 also includes a negative wire 28 connected to a second nonlinear circuit 30 that is in turn connected to a negative terminal of the battery 18.

In operation, the charger 14 provides power to the battery 18 over the two-line cable 20 and nonlinear circuits 22. Once the voltage between the terminals of the battery 18 reaches a predetermined voltage as measured at the terminals of the charger 14, the battery is considered charged.

The charging accessory 10 fails to account for voltage drops induced by the two-line cable 20 and the nonlinear circuits 22. When charging current flows from the charger 14 to the battery 18, a voltage drop occurs across the two-line cable 20 and nonlinear circuits 22. The voltage drop is a function of the current flowing over the two-line cable 20 and through the nonlinear circuits 22 and the impedances of the two-line cable 20 and nonlinear circuits 22. The current may vary with the charged state of the battery 18, and the impedances may vary with temperature, making the voltage drop difficult to predict and compensate for. As a result, the accessory 10 may undercharge or overcharge the battery 18. In addition, the charger 14 may require additional time to charge the battery 18 due to its inability to measure voltage drops or power dissipation introduced by the two-line cable 20 and nonlinear circuits 22.

Figure 2:
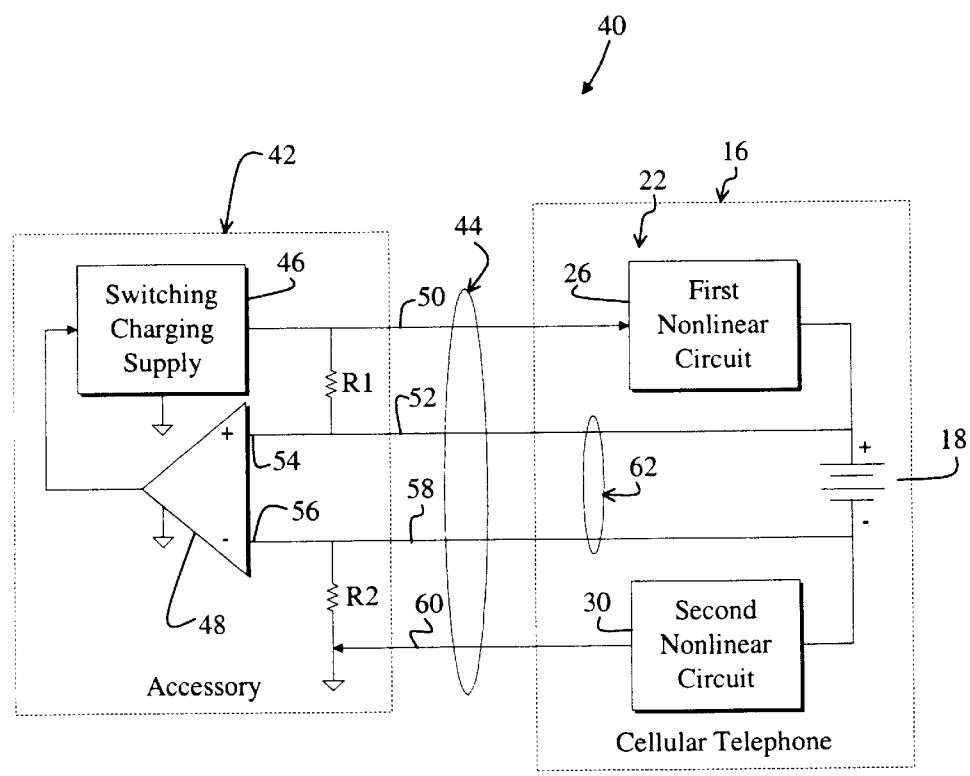
FIG. 2 is a diagram of a system for charging a battery of the present invention.

FIG. 2 is a diagram of a system 40 for charging the battery 18 and constructed in accordance with the teachings of the present invention. The system 40 includes an accessory 42 connected to the cellular telephone 16 via a four-line cable 44. The accessory 42 includes a charging supply 46, a subtractor circuit 48, a first resistor R1, and a second resistor R2. An output of the charging supply 46 is connected, in parallel, to one end of the first resistor R1 and to the first nonlinear circuit 26 via a first cable wire 50. An opposite end of the first resistor R1 is connected to a second cable wire 52 and a first input 54 of the subtractor circuit 48. The second cable wire 52 connects the first input 54 of the subtractor circuit 48 to a positive terminal of the battery 18 that is also connected to an output of the first nonlinear circuit 26. A second input 56 of the subtractor circuit 48 is connected to a third cable wire 58 and to one end of the second resistor R2. The third cable wire 58 connects the second input 56 of the subtractor circuit 48 to a negative terminal of the battery 18 that is also connected to an input of the second nonlinear circuit 30. An opposite end of the second resistor R2 is connected, in parallel, to a ground that is common to the charging supply 46, the subtractor circuit 48, and to a fourth cable wire 60 that is connected to an output of the second nonlinear circuit 30. Hence, an output of the second nonlinear circuit 30 is connected to ground via the fourth cable wire 60. An output of the subtractor circuit 48 provides input to the charging supply 46.

In operation, the charging supply 46 provides a charging current to the positive terminal of the battery 18 via the first cable wire 50 and the first nonlinear circuit 26. The first resistor R1 is chosen to be orders of magnitude larger than the combined resistance of the first cable wire 50 and the first nonlinear circuit 26. As a result, almost no current flows through the first resistor R1, but instead flows through the first cable wire 50 and the first nonlinear circuit 26. The voltage drop across the resistor R1 provides a measurement of the voltage drop occurring over the first cable wire 50 and the first nonlinear circuit 26. A signal pertaining to this measurement is provided to the first input of the subtractor circuit 54, which has an input impedance orders of magnitude larger than the resistance of the first resistor R1 and the second resistor R2. In the present specific embodiment, the resistance of the first resistor R1 is approximately 500 ohms and the input impedance of the subtractor circuit 48 is approximately a couple of megaohms.

Similarly, second resistor R2 is chosen to be large with respect to the combined resistance of the fourth cable wire 60 and the second nonlinear circuit 30, and is chosen to be small with respect to the input impedance of the subtractor circuit 48. As a result, almost no current flows through the second resistor R2. The voltage drop across the second resistor R2 is representative of the voltage drop across the fourth cable wire 60 and the second nonlinear circuit 30.

The second cable wire 52 and the third cable wire 58 are sensing wires 62 over which almost no current flows. As a result of the low current flow, almost no voltage is dropped across the second cable wire 52 or the third cable wire 58, and the difference between the voltages on the second cable wire 52 and the third cable wire 58, as provided by the subtractor circuit 48 to the charging supply 46, represents an accurate measurement of the voltage state of the battery 18. The charging supply 46 continues to charge the battery 18 by directing current over the first cable wire 50 and through the first nonlinear circuit 26 until the voltage of the battery 18 matches a predetermined voltage level, i.e., a state indicative of a fully charged battery, as indicated via the output of the subtractor circuit 48. The predetermined voltage level is application specific and depends on the type of battery being charged.

Hence, a small sensing current flows through the first resistor R1 from the output of the charging supply 46 to a positive terminal of the battery 18.

The voltage drop across the first resistor R1 represents the voltage drop across the first cable wire 50 and first nonlinear circuit 26 and any other relevant voltage drops within the cellular telephone 16 regardless of how they are created. This voltage drop information is provided to the first input 54 of the subtractor circuit 48.

Similarly, a small sensing current flows over a return path comprising the third cable wire 58 and the second resistor R2. The voltage dropped across the second resistor represents the voltage dropped across the fourth cable wire 60 and the second nonlinear circuit 30. This voltage drop information is provided at the second input 56 of the subtractor circuit 48. The output of the subtractor circuit 48 is an accurate measurement of the voltage state of the battery 18, which is fed back to the charging supply 46.

Power is supplied to the battery 18 over the first cable wire 50 and the first nonlinear circuit 26 until the voltage state of the battery 18, as indicated by the output of the subtractor circuit 48, has reached a predetermined charged state. By accurately accounting for the voltage drops occurring over the first cable wire 50 and the first nonlinear circuit 26, as well as the voltage drops occurring over the fourth cable wire 60 and the second nonlinear circuit 30, the system 40 allows for accurate and efficient charging of the battery 18. As a result, the battery 18 may be quickly and efficiently charged without the risk of overcharging or under charging.

If one of the additional sensing cable wires 62 breaks, i.e., the second cable wire 52 or the third cable wire 58, the system 40 will account for a voltage drop occurring across the first cable wire 50 and the first nonlinear circuit 26 or a voltage drop occurring across the fourth cable wire 60 and the second nonlinear circuit 30, depending on which cable wire breaks. If both of the sensing wires 62 break, the system 40 operates in a similar manner to the conventional system 10 of FIG. 1.

Those skilled in the art will appreciate that nonlinear circuits may be replaced with different types of circuits such as straight copper wires without departing from the scope of the present invention. In addition, the battery 18 may be a different type of battery other than a cellular telephone battery.

Switching charging supplies such as the charging supply 46 are known in the art and widely available. The charging supply 46 may obtain power via a cigarette power adapter, a wall outlet or another power source. The subtractor circuit 48 is easily implemented via a differential operational amplifier, which is known in the art and widely available.

In the present specific embodiment, the charging supply 46 is implemented as a switching charging supply whose output voltage is selectively controllable via feedback from the subtractor circuit 48. Those skilled in the art will appreciate that other types of charging supplies may be employed without departing from the scope of the present invention. For example, virtually any type of charging supply that provides for an adjustable voltage output may be employed.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for charging a battery over a linear or nonlinear circuit comprising:

first means for receiving a feedback signal and providing a charging signal to said battery over a first electrical path when said feedback signal indicates that said battery is not fully charged and second means for measuring a voltage state of said battery via second and third electrical paths and providing said voltage state as said feedback signal to said first means in response thereto, said voltage state accounting for voltage drops occurring over said circuit.

2. The system of claim 1 wherein said first means is a power supply and said second means is a sensing circuit.

3. The system of claim 2 wherein said power supply includes means for providing an adjustable output voltage.

4. The system of claim 2 wherein said sensing circuit includes a subtractor circuit for subtracting a voltage on said second electrical path from a voltage on said third electrical path and providing said feedback signal in response thereto.

5. The system of claim 4 wherein said second electrical path includes a wire connected between a first terminal of said subtractor circuit and a positive terminal of said battery.

6. The system of claim 5 wherein said second electrical path includes a first resistor connected between an output of said power supply and said first terminal of said subtractor circuit, said first resistor having a resistance orders of magnitude larger than a resistance of said circuit and orders of magnitude less than an input impedance of said subtractor circuit.

7. The system of claim 4 wherein said third electrical path includes a wire connected between a second terminal of said subtractor circuit and a negative terminal of said battery.

8. The system of claim 7 wherein said third electrical path includes a second resistor connected between a ground and said second terminal of said subtractor circuit, said second resistor having a resistance orders of magnitude larger than a resistance of said circuit and orders of magnitude less that an input impedance of said subtractor circuit.

9. A system for charging a battery to a predetermined voltage comprising:

a power supply for providing an output current in response to an input signal;

a circuit for directing said output current from said power supply to said battery;

means for determining a voltage drop across said circuit; and means for providing a signal indicative of a state of said battery, said signal a function of said voltage drop and provided as said input signal to said power supply.

10. The system of claim 9 wherein said power supply includes means for providing an adjustable output voltage.

11. The system of claim 10 wherein said power supply has an output terminal.

12. The system of claim 11 wherein said circuit includes a cable having a first electrical sensing path connected between said positive output terminal and a positive battery terminal.

13. The system of claim 12 wherein said first electrical sensing path includes a first sensing resistor.

14. The system of claim 12 wherein said cable further includes a positive charging path connected between said positive output terminal and said positive battery terminal.

15. The system of claim 14 wherein said positive charging path includes a first nonlinear circuit.

16. The system of claim 11 wherein said circuit includes a cable having a second electrical sensing path connected between said negative output terminal and a negative battery terminal.

17. The system of claim 16 wherein said second electrical sensing path includes a second sensing resistor.

18. The system of claim 16 wherein said cable further includes a negative charging path connected between said positive output terminal and said positive battery terminal.

19. The system of claim 18 wherein said negative charging path includes a second nonlinear circuit.

20. The system of claim 18 wherein a positive terminal of said battery is connected to a first terminal of a subtractor circuit.

21. The system of claim 20 wherein said negative terminal of said battery is connected to a second terminal of said subtractor circuit.

22. The system of claim 21 wherein an output of said subtractor circuit corresponds to said input signal to said power supply.

23. A system for charging a battery to a predetermined voltage comprising:

a power supply for providing an output current in response to an input signal;

a circuit for directing said output current from said power supply to said battery;

a sensing circuit for determining a voltage drop across said circuit; and a subtractor circuit for subtracting said voltage drop from an output voltage state of said battery and providing a signal indicative of a state of said battery in response thereto, said signal provided as said input signal to said power supply.

24. A system for charging a battery to a predetermined voltage comprising:

first means for providing a charging signal;

second means for interfacing said first means to said battery, said second means introducing an alteration to said charging signal;

third means for measuring said alteration and providing a signal indicative of an output state of said battery in response thereto;

fifth means for comparing said output state to said predetermined voltage and providing a control signal in response thereto;

sixth means for selectively adjusting said first means in response to said control signal to selectively alter said charging signal.

25. The system of claim 24 wherein said first, fifth, and sixth means are implemented via a power supply having means for providing an adjustable output voltage.

26. The system of claim 24 wherein said charging signal is a predetermined current.

27. The system of claim 26 wherein said second means includes a cable and said alteration is a reduction in said predetermined current, said alteration corresponding to a voltage drop between said first means and said battery.

28. A method for charging a battery over a linear or nonlinear circuit comprising:

receiving a feedback signal and providing a charging signal to said battery over a first electrical path when said feedback signal indicates that said battery is not fully charged and measuring a voltage state of said battery via second and third electrical paths and providing said voltage state as said feedback signal to said first means in response thereto, said voltage state accounting for voltage drops occurring over said circuit.

* * * * *